Oct. 22, 1968  MASAO HORI  3,407,316
METHOD OF AND APPARATUS FOR ALTERNATING CURRENT TO DIRECT
CURRENT CONVERSION UTILIZING A LIQUID
METAL CIRCULATION LOOP
Filed Feb. 2, 1965

INVENTOR.
MASAO HORI
BY
Oldham & Oldham
ATTYS.

United States Patent Office 3,407,316
Patented Oct. 22, 1968

3,407,316
METHOD OF AND APPARATUS FOR ALTERNATING CURRENT TO DIRECT CURRENT CONVERSION UTILIZING A LIQUID METAL CIRCULATION LOOP
Masao Hori, Naka-gun, Japan, assignor to Nihon Genshiryoku Kenkyu-sho, Tokyo, Japan
Filed Feb. 2, 1965, Ser. No. 429,859
Claims priority, application Japan, Apr. 2, 1964, 39/18,299
1 Claim. (Cl. 310—11)

ABSTRACT OF THE DISCLOSURE

This apparatus for converting alternating current to direct current includes a closed loop circulation system with liquid metal therein and means to circulate the liquid metal through the system. A magnetohydrodynamic generator surrounds at least a portion of the piping circulation system. Cooling means are present to control the temperature of the liquid in the system and other means are provided to control the average flow velocity of the liquid metal through the system.

---

This invention relates to alternating current to direct current conversion, and particularly to methods of and apparatus for converting an alternating-current power to a direct-current power by utilization of a liquid metal circulation loop.

The present invention has for its object to obtain a direct-current power of low voltage and high current value from an alternating-current power supply.

Another object of the present invention is to obtain a low-voltage high DC current power from an alternating-current power supply in a manner so that the voltage and current values of the DC power output may readily be controlled.

As used herein, the term "low voltage" refers to a voltage of not higher than 10 volts and the term "high current" to a current of not lower than 1,000 amperes. Such low-voltage high DC currents are usable in various applications involving a high power consumption at low voltage, for example, in the direct heating of metals and the energization of superconductive magnets. The low-voltage high DC current powers are also utilizable in practicing the "method of electromagnetically separating a dispersed phase from a mixed-phase fluid" which is disclosed in the copending application Ser. No. 385,979 filed on July 29, 1964.

Previously, various systems have been in use to obtain a direct-current power of low voltage and high current value from an alternating-current power supply. In one system, a combination of a transformer and a rectifier unit is used and in another a rotary direct-current generator is driven by an alternating-current power supply. In any of previous systems, however, various technical difficulties have been involved. For example, the extraordinarily high current value necessitates use of heavy conductors rendering the entire apparatus excessively bulky. Particularly, where a rotary generator is employed, a technical difficulty is involved in taking the current from the armature since use of ordinary brushes is not allowed with high currents, such as the present invention concerns.

Overcoming the above difficulties, the present invention provides a novel method of obtaining a direct-current power of low voltage and high current value from an alternating-current power supply with efficiency.

Also, according to the present invention, an apparatus for alternating current to direct current conversion is provided which comprises a liquid metal circulation loop including a circulating pump driven from an alternating-current power supply source, a magnetohydrodynamic generator comprised of a permanent magnet or a direct-current electro-magnet and electrodes, and a cooling unit for controlling the temperature of the liquid metal.

The above and other objects, features and advantages of the present invention will become apparent from the following description when taken in conjunction with the accompanying drawing, in which.

Figure 1:
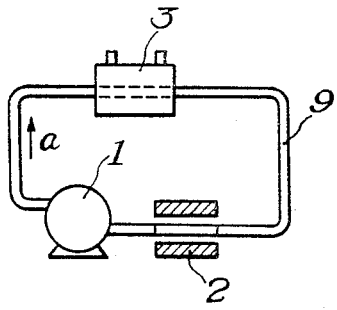
FIG. 1 is a schematic illustration of the apparatus for AC to DC conversion according to the present invention.

Referring to the drawing and first to FIG. 1, the principles of the present invention will be explained. Liquid metal is circulated through a loop form of conduit 4 in the direction of the arrow $a$ by a pump 1 driven by an alternating-current power supply. Reference numeral 2 indicates a magnetohydrodynamic generator comprised of a direct-current (electromagnet or a permanent magnet) and electrodes and in which generator the mechanical work done on the liquid metal by the pump 1 is converted into a direct-current power. A cooler unit 3 is provided to control the temperature of the liquid metal in the circulation loop.

The liquid metal circulating pump is preferably of the centrifugal or other mechanical type because of its efficiency or alternatively may be an AC electromagnetic pump. Usable forms of liquid metal pump of the mechanical type include the following:

(1) Canned rotor membrane seal centrifugal pump;
(2) Magnetic drive membrane seal centrifugal pump;
(3) Frozen seal centrifugal pump;
(4) Totally enclosed centrifugal sump gas seal pump;
(5) Shaft seal centrifugal sump gas seal pump; and
(6) Reciprocating gas seal pump.

Usable types of AC electromagnetic pump for liquid metal use are as follows:

(1) AC Faraday type;
(2) Helical induction type; and
(3) Linear induction type.

The cooler unit used may be of any convenient type. The magnetohydrodynamic generator may be of any known type for direct current generation. Kinds of metal usable as circulating liquid include Na (sodium), NaK (sodium-potassium alloy), K (potassium) and Hg (mercury). The entire loop of conduit for circulation of liquid metal is preferably formed of a material, such as type 304 stainless steel.

Figure 2:
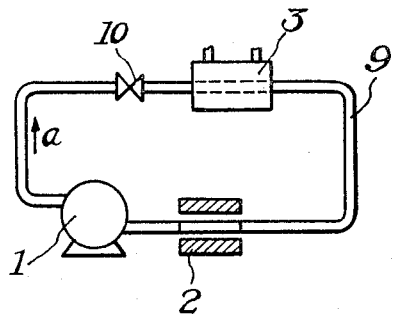
FIG. 2 is a modification of the apparatus of FIG. 1 including a flow control valve.
Figure 3:
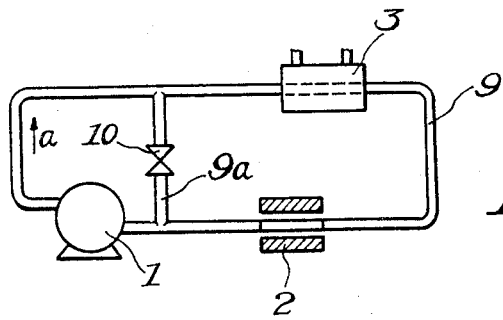
FIG. 3 is another modification of the apparatus of FIG. 1 including a bypass line.

Fluctuations of the load upon the entire loop can be compensated for by varying the amount of work done on the circulaing liquid metal thereby to regulate the direct-current power output, either by varying the r.p.m. of the pump or by providing a flow control valve in the circulation loop or a bypass line thereto. For example, in case the load is increased, the r.p.m. of the pump is increased or the flow control valve in the loop of circulation or a valve in the bypass line is controlled so as to increase the rate of flow of liquid metal through the circulation loop thereby to obtain an increased DC power output. The circulation loop including a flow control valve is illustrated in FIG. 2 and the loop having a bypass line in FIG. 3.

The output voltage of the magnetohydrodynamic generator can be varied by changing the distance between the electrodes, or the magnetic flux density of the electromagnet, or also the velocity of flow of the liquid metal.

For example, increase in voltage of the generator output is obtainable with increase in the electrode distance, the magnetic flux density of the electromagnet, and/or the velocity of the liquid metal flow.

An embodiment of the present invention will next be described which employs NaK as working fluid and produces a direct current output of 13,500 amperes.

Figure 4:
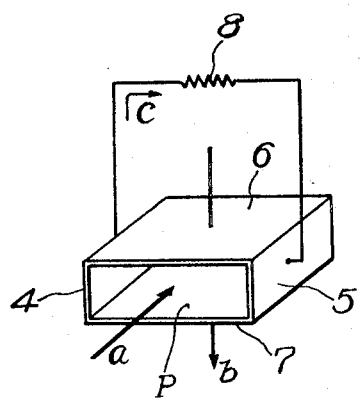
FIG. 4 is an explanatory illustration of one form of magnetohydrodynamic generator usable in the present invention.

As shown in FIG. 4, the embodiment includes a magnetohydrodynamic generator comprised of a direct-current electromagnet and a rectangular duct P. Assuming that the direct-current magnet produces magnetic lines of force extending in the direction of the arrow $b$ and the fluid, NaK, is caused to flow in the direction of the arrow $a$, direct-current electromotive force is produced in a direction at right angles to the magnetic lines of force as well as to the liquid metal flow, i.e. between the electrodes 4 and 5. The direct current produced flows from the positive electrode 4 through load 8 to the negative electrode 5 in the direction of the arrow $c$. The walls 6 and 7 of the duct P are made of an appropriate electrical insulator to minimize the loss of the power output. The fluid, NaK, is circulated by a suitable centrifugal pump (not shown), the r.p.m. of which is variable to adjust the magnitude of the converted power output. Also, an appropriate cooler (also not shown) is provided in the fluid circuit to prevent temperature rise of the fluid, NaK.

The particulars of the AC to DC converter are listed below.

(1) Conversion capacity:
   AC input (pump input)—49.8 kw.
   DC output (1.35 v., 13,500 a.)—18.2 kw.
   (In case of the lead resistance including resistances of conductors and other components is $9 \times 10^{-5} \Omega$, the internal resistance of the generator is $10^{-5} \Omega$.)
   Conversion efficiency—36.5%

(2) Working fluid:
   Composition—Na 22%, K 78% (melting point $-11°$ C.)
   Working temperature—ab. 50° C.

(3) Magnetohydrodynamic generator:
   Magnet—Electromagnet, 10,000 gauss
   Electrodes—50 mm. (height) × 100 mm. (length)
   Duct section—Rectangular, 50 mm. (height) × 150 mm. (width)
   Average flow velocity—10 m./sec.

(4) Pump:
   Type—Two-stage turbine, frozen seal centrifugal pump
   Pumping head—3.9 kg./cm.$^2$
   Flow rate—75 l./sec.
   Bore—200 mm.
   Pumping efficiency—60%
   Shaft horsepower—64.3 PS (5) Cooler:
   Type—Air-cooled finned-tube type
   Capacity—27,000 kcal./hr. at 50° C. NaK temperature Having described the principles of the present invention and one preferred embodiment thereof, it will be apparent that according to the present invention a high DC current can be obtained relatively easily by employing a liquid metal circulation loop for magnetohydrodynamic power generation.

What is claimed is:

1. In an apparatus for converting alternating current to direct current, the combination of:
   a closed loop piping circulation system,
   a liquid metal in the system,
   means to circulate the liquid metal through the system,
   alternating current power supply means for the circulating means,
   cooling means for controlling the temperature of said liquid metal through the system,
   means to control the average flow velocity of said liquid metal through the system,
   a magnetohydrodynamic generator surrounding at least a portion of the piping circulation system which includes
   means to direct a magnetic field substantially perpendicular to the flow path of the liquid metal, and electrode means adjacent the piping system to pick up DC current generated by the movement of the liquid metal through the magnetic field,
   a by-pass line connected to the circulation system across the circulating means, and
   a control valve connected in the by-pass line to control the average flow velocity of the liquid metal in the portion of the circulation system including the magnetohydrodynamic generator.

References Cited

UNITED STATES PATENTS

| | | | |
|---|---|---|---|
| 2,490,009 | 11/1949 | Thomas | 310—11 |
| 3,034,002 | 5/1962 | Carlson | 310—11 |
| 3,209,179 | 9/1965 | Rosa | 310—11 |

MILTON O. HIRSHFIELD, *Primary Examiner.*

D. X. SLINEY, *Assistant Examiner.*